(12) United States Patent
Nader (10) Patent No.: US 8,486,277 B1
(45) Date of Patent: Jul. 16, 2013

(54) INTERNAL BYPASS FILTRATION CIRCUIT

(75) Inventor: Gregg A. Nader, Libertyville, IL (US)

(73) Assignee: Sonnax Industries, Inc., Bellows Falls, VT (US)

( * ) Notice: Subject to any disclaimer, the term of this patent is extended or adjusted under 35 U.S.C. 154(b) by 1257 days.

(21) Appl. No.: 11/823,536

(22) Filed: Jun. 27, 2007

Related U.S. Application Data (60) Provisional application No. 60/817,283, filed on Jun. 28, 2006.

(51) Int. Cl.
*B01D 37/00* (2006.01)
*F01M 11/03* (2006.01)

(52) U.S. Cl.
USPC .......... 210/805; 210/167.08; 210/172.3; 210/167.04; 210/167.05; 210/196; 210/251; 210/416.5; 184/6.24

(58) Field of Classification Search
None
See application file for complete search history.

(56) References Cited

U.S. PATENT DOCUMENTS

| | | | |
|---|---|---|---|
| 3,056,501 A * | 10/1962 | Thorman et al. | 210/132 |
| 3,945,208 A * | 3/1976 | O'Connor | 60/420 |
| 4,343,697 A * | 8/1982 | Miller et al. | 210/90 |
| 4,387,023 A * | 6/1983 | Napier | 210/167.08 |
| 5,089,129 A * | 2/1992 | Brigman | 210/223 |
| 5,246,086 A * | 9/1993 | Yunick | 184/1.5 |
| 5,546,999 A * | 8/1996 | Parker | 141/98 |
| 6,241,038 B1 * | 6/2001 | Young et al. | 180/53.8 |
| 6,245,232 B1 * | 6/2001 | Craft | 210/249 |
| 6,669,451 B1 * | 12/2003 | Wall | 417/313 |
| 6,790,348 B2 * | 9/2004 | Orborn | 210/167.08 |
| 6,793,812 B2 * | 9/2004 | Caldwell et al. | 210/167.04 |
| 6,835,306 B2 * | 12/2004 | Caldwell | 210/167.04 |
| 6,932,902 B2 * | 8/2005 | Hirasawa et al. | 210/167.04 |
| 6,997,238 B1 * | 2/2006 | Ruthy et al. | 165/41 |
| 7,056,432 B2 * | 6/2006 | Smith | 210/132 |
| 7,056,442 B2 * | 6/2006 | Hansen | 210/805 |
| 7,179,390 B1 * | 2/2007 | Layton | 210/767 |
| 7,294,263 B2 * | 11/2007 | Johnson et al. | 210/232 |
| 7,300,581 B2 * | 11/2007 | Seipold | 210/232 |
| 7,357,865 B1 * | 4/2008 | Nader | 210/232 |
| 7,479,219 B2 * | 1/2009 | Rassinger | 210/130 |
| 7,510,662 B1 * | 3/2009 | Hansen | 210/805 |
| 7,553,408 B2 * | 6/2009 | Nystrom et al. | 210/109 |
| 7,704,384 B2 * | 4/2010 | Stein | 210/131 |
| 7,992,667 B2 * | 8/2011 | Rennie | 180/219 |
| 7,993,530 B2 * | 8/2011 | Horne | 210/767 |
| 8,038,877 B2 * | 10/2011 | Stausberg et al. | 210/167.08 |
| 2003/0006085 A1 * | 1/2003 | Caldwell et al. | 180/339 |
| 2003/0006179 A1 * | 1/2003 | Caldwell | 210/168 |
| 2003/0155287 A1 * | 8/2003 | Osborn | 210/172 |

(Continued)

*Primary Examiner* — Robert James Popovics
(74) *Attorney, Agent, or Firm* — Downs Rachlin Martin PLLC; Clifford F. Rey, Esq.

(57) ABSTRACT

An internal bypass filtration circuit including a microfine depth filtration cartridge, which operates in combination with the sump filter of an automatic transmission is disclosed. The present depth filtration cartridge functions to remove particulate matter as small as five microns to improve fluid cleanliness level without restricting fluid flow to the pump ensuring its volumetric efficiency. In one embodiment transmission fluid passes through a calibrated orifice in the bypass circuit to regulate flow to the depth filtration cartridge. In an alternate embodiment the depth filter media itself regulates filtration below a predetermined fluid pressure. The internal bypass circuit is installed by accessing a pressurized fluid circuit in the transmission valve body. A hydraulic bypass line interconnects such pressurized fluid circuit with the depth filtration cartridge, which is mounted internally of the transmission housing. The outlet of the depth filtration cartridge exhausts directly into the sump bypassing all other functional circuits.

6 Claims, 7 Drawing Sheets

U.S. PATENT DOCUMENTS

| | | | |
|---|---|---|---|
| 2004/0164009 A1* | 8/2004 | Smith | 210/132 |
| 2004/0256308 A1* | 12/2004 | Yates | 210/416.1 |
| 2006/0016740 A1* | 1/2006 | Schultz et al. | 210/130 |
| 2006/0043027 A1* | 3/2006 | Nguyen et al. | 210/767 |
| 2006/0102552 A1* | 5/2006 | Stein | 210/483 |
| 2006/0175239 A1* | 8/2006 | Johnson et al. | 210/232 |
| 2006/0201864 A1* | 9/2006 | Seipold | 210/232 |
| 2006/0207928 A1* | 9/2006 | Morikawa et al. | 210/435 |
| 2006/0231482 A1* | 10/2006 | Khalil et al. | 210/473 |
| 2006/0260995 A1* | 11/2006 | McCormick et al. | 210/232 |
| 2007/0017873 A1* | 1/2007 | Jurado et al. | 210/695 |
| 2007/0023336 A1* | 2/2007 | Owens | 210/130 |
| 2007/0151906 A1* | 7/2007 | Beer et al. | 210/130 |
| 2007/0209982 A1* | 9/2007 | Nystrom et al. | 210/132 |
| 2007/0215559 A1* | 9/2007 | Nguyen et al. | 210/767 |
| 2008/0041779 A1* | 2/2008 | Farace | 210/234 |
| 2008/0290013 A1* | 11/2008 | Stausberg et al. | 210/167.04 |
| 2009/0071885 A1* | 3/2009 | Kreuzer | 210/167.08 |
| 2009/0127174 A1* | 5/2009 | Shinbori et al. | 210/167.08 |
| 2009/0139922 A1* | 6/2009 | Poskie et al. | 210/167.08 |
| 2009/0230049 A1* | 9/2009 | Stausberg et al. | 210/416.5 |
| 2009/0294343 A1* | 12/2009 | Pekarsky et al. | 210/167.08 |
| 2009/0301954 A1* | 12/2009 | Beer et al. | 210/167.08 |
| 2010/0038296 A1* | 2/2010 | Beer et al. | 210/167.03 |

* cited by examiner

INTERNAL BYPASS FILTRATION CIRCUIT

CROSS-REFERENCE TO RELATED APPLICATION

This application claims the benefit under 35 U.S.C. 119(e) of U.S. Provisional Patent Application No. 60/817,283 filed Jun. 28, 2006 entitled, Internal Bypass Filtration Circuit.

BACKGROUND OF INVENTION

The present invention relates to automatic transmissions for land vehicles and, more particularly, to an internal bypass filtration circuit for such automatic transmissions. For purposes of this application the term "internal" refers to a physical location (i.e. a space or cavity) inside a transmission and is not be confused with terminology such as "filter with an internal by-pass". The latter terminology refers to a common feature of a hydraulic filter element wherein if oil flow through the filter element becomes restricted, then an internal by-pass mechanism or passage within the filter opens and allows the oil to by-pass the filter element and keeps the oil circuit functioning.

Maintaining automatic transmission fluid (hereinafter "ATF") in a clean condition free of particulates and contamination is critical to the proper function of an automatic transmission. Contamination of ATF is of particular concern to the automatic transmission rebuilding industry where there is a general trend toward achieving increased service longevity from remanufactured automatic transmissions. However, recent industry data is confirming exponentially higher contamination levels in remanufactured units due to various contributing factors and, accordingly, there is a need for increased filtration efficiency in such remanufactured transmissions.

Most automatic transmissions and transaxles use a standard wet sump system wherein ATF drains by gravity into the pan and the pump takes it up directly and discharges it to the hydraulic system. In a typical automotive application an ATF sump filter is submerged in the pan in fluid communication with the transmission pump. As the pump rotates ATF is drawn from the sump and through the filter by vacuum into the suction port of the pump.

Pumps in automatic transmission hydraulic systems are typically positive displacement pumps driven at engine speed. A positive displacement pump is one, which has the same output per revolution regardless of pump speed or pressure already developed in the system. Given the continuous flow requirements of the hydraulic system, a consistent flow of ATF through the filter to the pump is critical to proper lubrication and function of the transmission.

Because a sump filter is on the inlet side of the pump, it must not unduly restrict ATF uptake to the pump. This is a particular problem during cold start-up, hot idle and high volume/demand situations. Thus, it will be appreciated by those skilled in the art that the ATF filtration system has conflicting functions (i.e. ATF must flow freely to the pump without restriction, but must be filtered to remove harmful contaminants, which inherently restricts ATF flow).

The present internal bypass filtration system has been developed to resolve this problem and other shortcomings of the prior art.

SUMMARY OF THE INVENTION

Accordingly, the present invention is an improved ATF filtration system for an automatic transmission that provides an internal bypass filtration circuit including a microfine depth filtration cartridge (i.e. ATF is passed through several layers of filter media), which operates in conjunction with the original equipment manufacture (hereinafter "OEM") sump filter to increase ATF cleanliness level.

In accordance with a method of the present invention, the internal ATF bypass circuit is installed by drilling an access hole into an existing pressurized ATF circuit in the valve body or other access point within the transmission assembly. Thereafter, the access hole is threaded and a hydraulic bypass line with a mating threaded fitting is installed therein to deliver ATF to the depth filtration cartridge during pump operation.

ATF passes through a calibrated restriction (i.e. orifice) as it flows through the bypass line and is delivered to the depth filtration cartridge wherein ATF passes through the depth media. The outlet of the depth filtration cartridge exhausts directly into the sump/pan area bypassing all other functional circuits. The depth filtration cartridge includes a dedicated mounting bracket adaptable for a given transmission application.

The present depth filtration cartridge functions to remove a wide range of particulate matter (i.e. as small as 5 microns) from the ATF, but does not interfere with the unrestricted flow of ATF to the pump to ensure its volumetric efficiency and the proper function of the OEM filtration system.

The present bypass filtration circuit including the depth filtration cartridge is designed for installation in an open cavity or space within the transmission during remanufacturing operations using pre-existing fasteners from the transmission. By installing the present internal bypass filtration circuit as an upgrade during remanufacture, a local auto repair shop technician need not be relied upon to plumb and install such a depth filtration device externally of the transmission, which is the only option in current industry practice. Such practice often results in improper installation, ATF leakage, and pressure loss within the transmission system reducing the service longevity of such an externally installed device.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
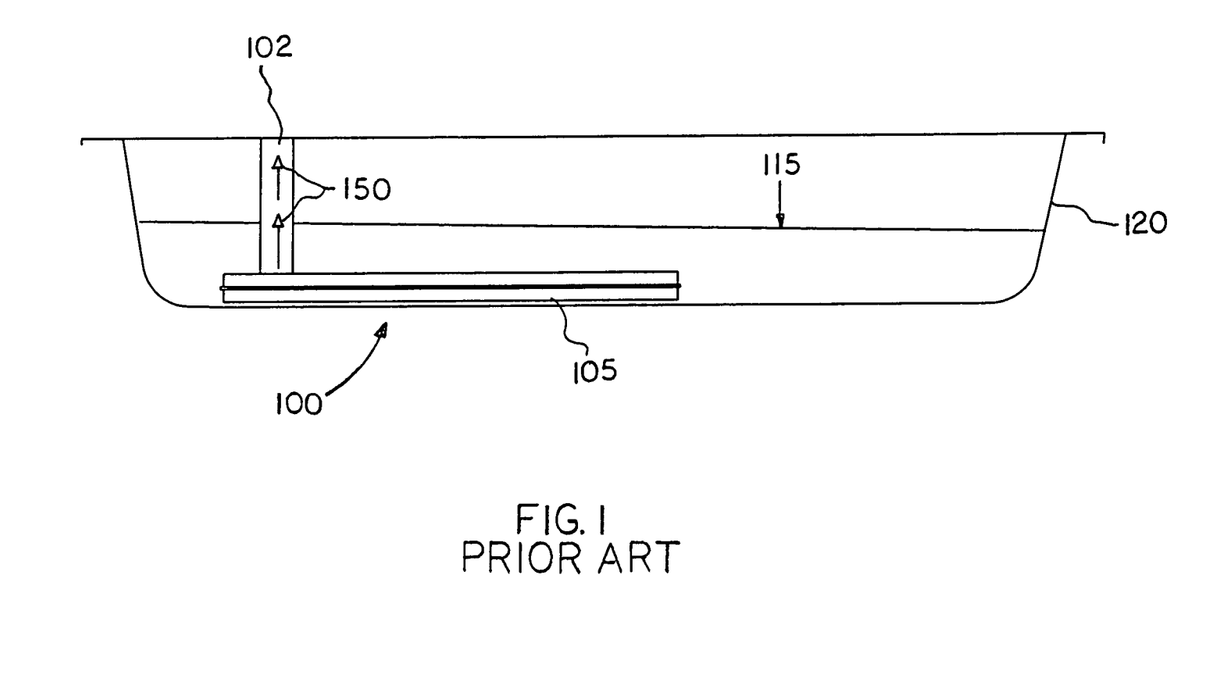
FIG. 1 is schematic representation of the sump of an automatic transmission showing the position of an OEM sump filter in the ATF pan and is labeled Prior Art.

Prior to describing the present invention in detail, it may be beneficial to briefly discuss the structure and function of a so-called sump filter in an automatic transmission. With further reference to the drawings there is shown an illustration of such an ATF sump filter, indicated generally at 100, within the sump or pan 120 of an automatic transmission. Such a sump filter 100 is comprised of a housing 105, which is submerged below the ATF level as at 115 in the pan. Housing 105 is disposed in fluid communication via suction tube 102 with the transmission pump, indicated generally at 125 and shown in FIG. 2.

Figure 2:
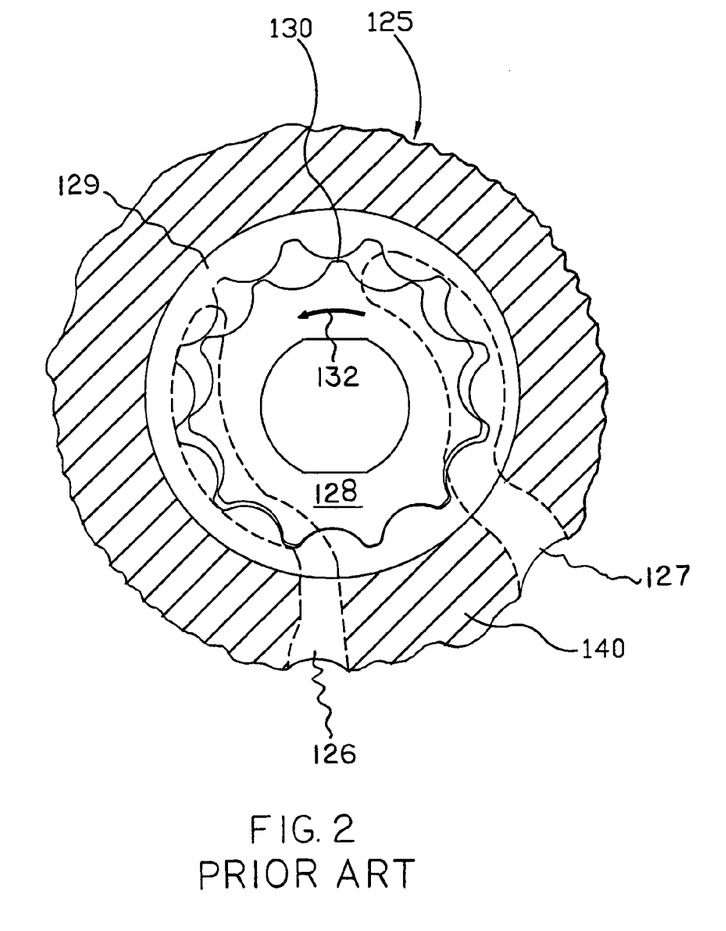
FIG. 2 is a cutaway plan view of a fixed displacement, Gerotor type ATF pump installed within the pump body and is labeled Prior Art.

A positive displacement pump 125 of the Gerotor type is shown in FIG. 2 for purposes of explanation. Of course, other types of positive displacement pumps such as gear pumps and vane pumps may be utilized with the present invention. In the Gerotor type pump 125 as the inner rotor 128 turns each of its teeth maintains continuous line contact with a tooth of the outer rotor 129, the point of contact shifting from the flanks of the teeth 130 at full mesh to the tops of the teeth upon rotation as shown by the directional arrow 132. In this way a pumping action is developed.

Passages or ports 126, 127 are required in the pump body 140 to carry ATF into the suction side and away from the discharge side respectively of the pump 125 to the hydraulic system. Rotation of the pump 125 at engine speed generates vacuum within the suction port 127, which draws ATF from the pan 120 through primary inlet 135 and the sump filter element 110 via suction tube 102 as shown by directional arrows 150 (FIG. 3).

Figure 3:
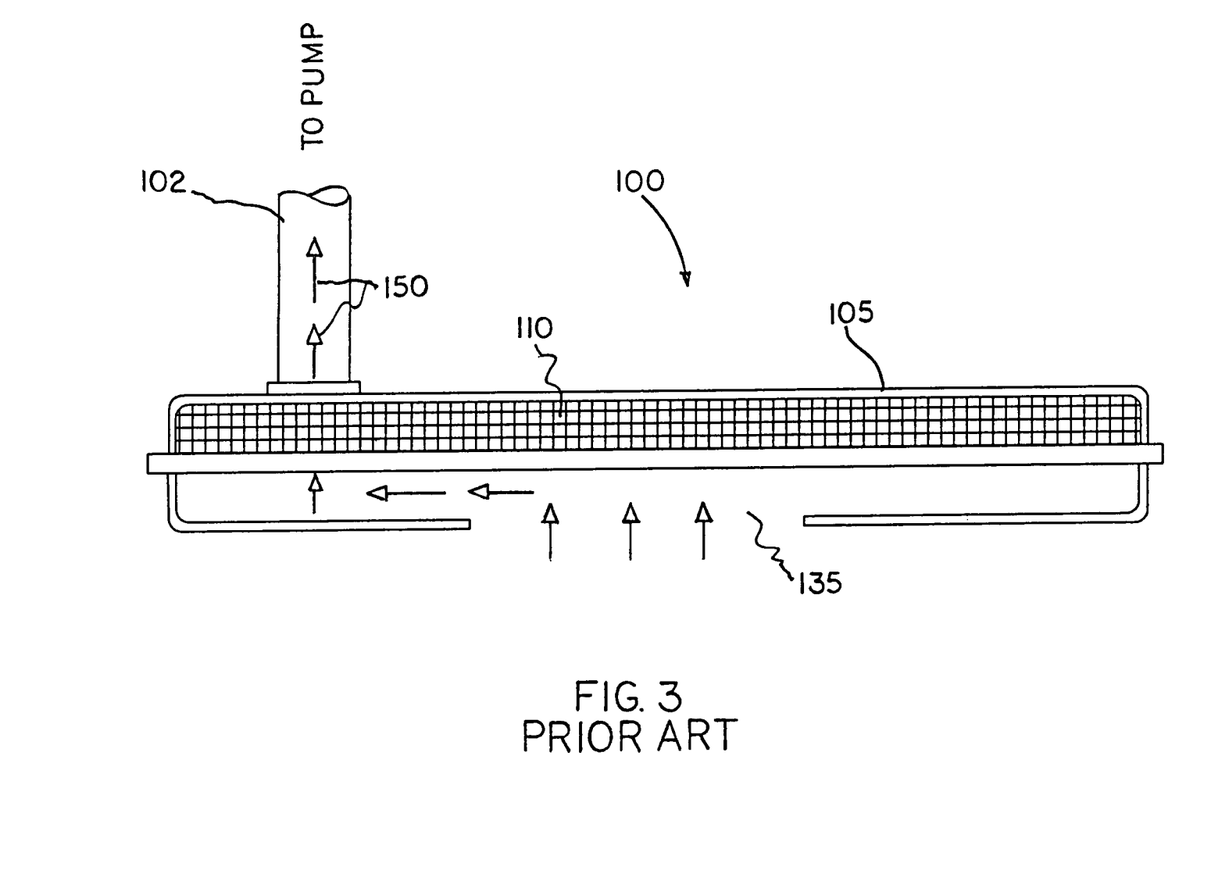
FIG. 3 is a schematic representation of an OEM filter housing and is labeled Prior Art.

As shown in FIG. 3 the OEM sump filter 100 typically contains a filter element 110 that is rated in the range of 25-100 microns, through which ATF must pass en route to the pump 125. A micron rating is a generalized way of indicating the ability of the filter element 110 to remove contaminants by the size of the particles. The importance of removing even the smallest particles to extend the operating life of ATF and components has been well established. But the micron rating does not properly and fully describe either the efficiency or the contaminant-holding capacity of the filter.

Component wear is directly related to the cleanliness level of the system (i.e. to the number of solid particles in the ATF). Thus, the cleaner the fluid, the less wear in the transmission. Not only large particles with diameters roughly equal to the micron rating, but also sludge particles smaller than 5 microns can cause significant damage, break downs, and generally degrade the ATF.

The media utilized in the OEM filter element 110 is the physical mechanism used for contamination control. The media utilized in OEM filter elements ranges from mesh screens to synthetic microfibers blended in various configurations. Media construction and filter configuration are used to determine the filter's efficiency for particle removal and must be balanced against the pressure drop, or resistance to flow, which are a normal consequence of filtration.

Because a sump filter 100 in an automatic transmission of the type shown in FIG. 3 is disposed on the inlet side of the pump, it must guarantee a restriction-free flow of ATF to the hydraulic system. This is a particular problem during cold start-up, hot idle and high volume/demand situations. Thus, it will be appreciated that the ATF filtration system has conflicting functions (i.e. ATF must flow freely to the pump 125 without restriction, but must be filtered to remove harmful contaminants, which inherently restricts ATF flow). Accordingly, the present invention has been developed to balance this inherent effect of filtration with the desired cleanliness level and will now be described in detail.

Figure 4A:
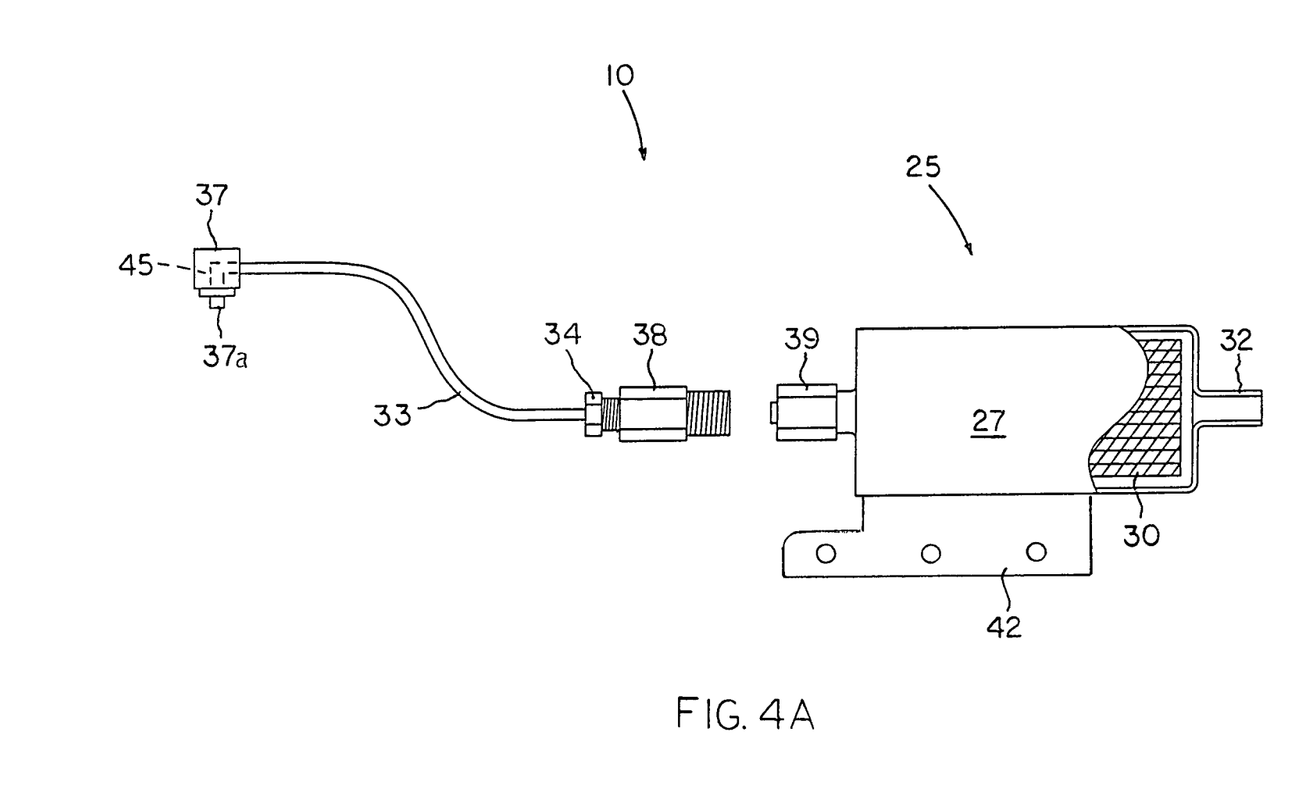
FIG. 4A is a partially cutaway elevation view of an embodiment of the depth filter assembly of the present invention.

The present internal bypass filtration system provides structures and functional features, which comprise microfine depth filtering means including, but not limited to, the following structures. Referring to FIG. 4A, the present internal bypass filtration circuit, indicated generally at 10, comprises a microfine depth filtration assembly, indicated generally at 25, with an attached hydraulic bypass line 33 that functions independently of the OEM sump filter 100 to remove a wider range of particle sizes and contaminants from the ATF to improve cleanliness.

In the present internal bypass circuit 10 ATF is forced under pressure through depth filter assembly 25 independently of ATF taken up directly by the pump 125 bypassing all other functional hydraulic circuits within the transmission system. The filtered ATF output of the depth filtration assembly 25 exhausts via outlet port 32 directly into the sump 120 to be recirculated by the pump 125.

Depth filtration assembly 25 comprises a filter canister 27 containing depth filtration media 30 designed to capture particles as small as 5 microns in size, which are not visible without magnification. It has been determined that particulates in this size range can be damaging to the transmission hydraulic system and that removing such contaminants will prevent early system failure and/or continuing hydraulic system leakage.

Still referring to FIG. 4A, depth filtration media 30 contained in the present filter canister 27 comprises microfine mesh, synthetic fibers, cellulose fibers, and/or multi-layer media in various configurations for a given transmission application. In one embodiment an orifice block 37 defining a calibrated restriction or orifice 45 is attached to a first end of bypass line 33. Orifice block 37 includes a fitting 37a having an external #10-32 thread for engagement in a threaded access hole 35 (FIG. 5) formed in the valve body in accordance with a method of the present invention, which is described hereinafter in further detail.

Figure 4B:
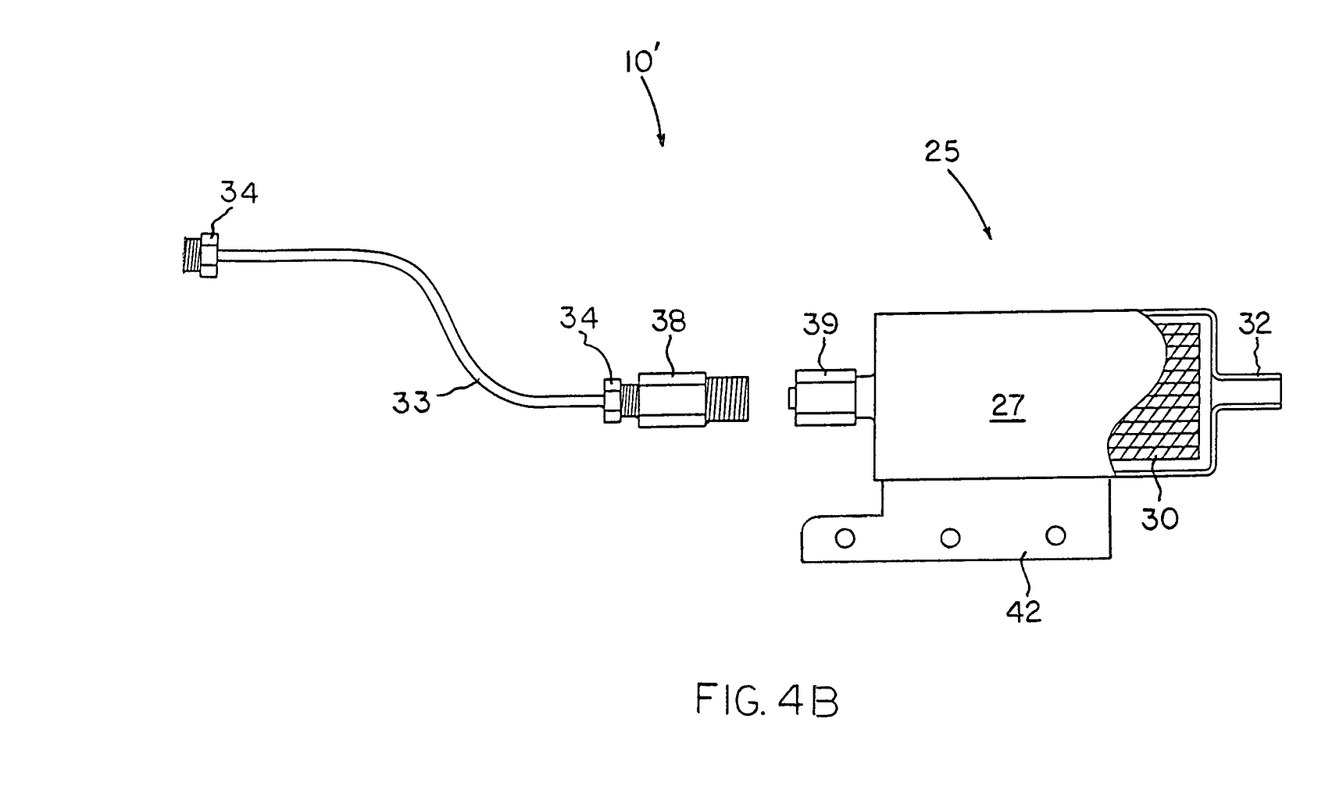
FIG. 4B is a partially cutaway elevation view of another embodiment of the depth filter assembly of the present invention.

In an alternative embodiment of the present internal bypass filtration circuit 10' shown in FIG. 4B, orifice block 37 is omitted and the filter media 30 within the canister 27 is designed such that the filter media itself regulates and will not permit any appreciable ATF flow through the canister 27 below a predetermined fluid pressure to ensure the volumetric efficiency of the pump 125 and that sufficient fluid pressure is maintained within the transmission system. In this embodiment a first end of hydraulic bypass line 33 is provided with a flare nut 34 that connects the bypass line directly to the threaded access hole 35 formed in the valve body 40. An opposite end of hydraulic bypass line 33 is also provided with a flare nut 34 that connects the bypass line to a threaded coupling 38 which, in turn, engages a mating fitting 39 attached to the canister 27.

Figure 5:
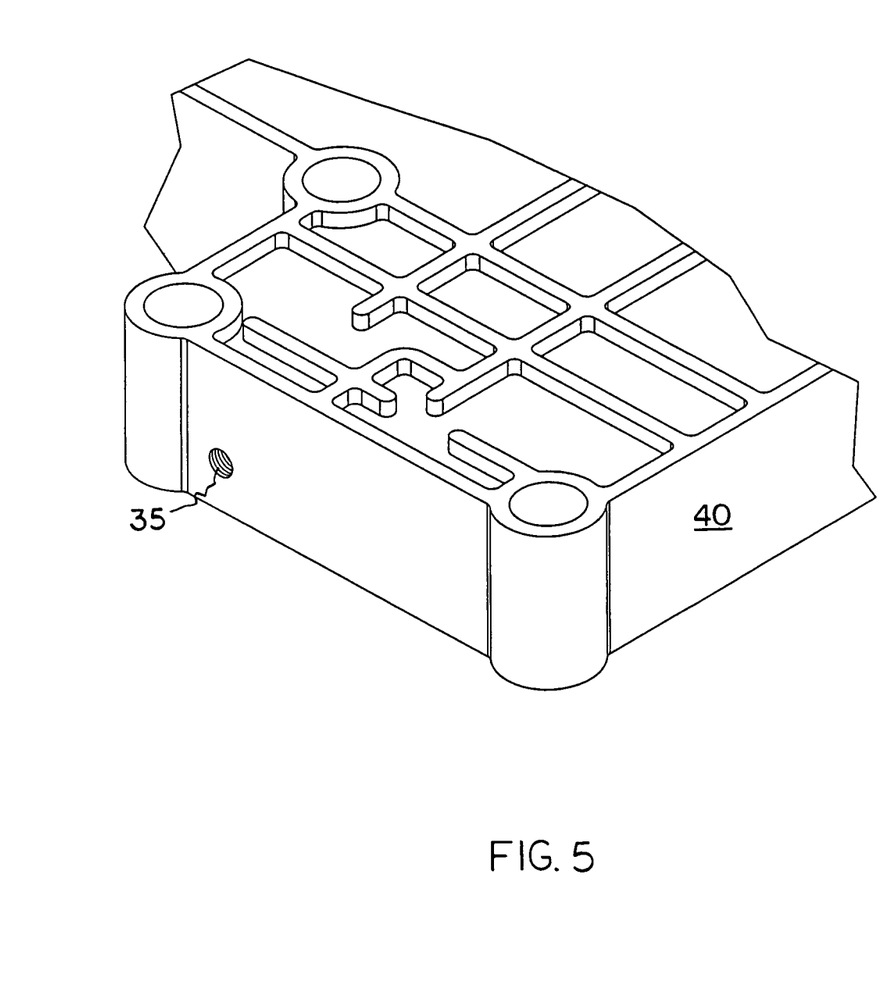
FIG. 5 is a partial perspective view of a valve body of an automatic transmission illustrating the location of an access hole wherein the present depth filter assembly is installed.

In a method of the present invention, the internal ATF bypass circuit 10, 10' is installed for operation in conjunction with an OEM filtration system described hereinabove by drilling an access hole 35 into a pressurized hydraulic circuit contained within the valve body 40 at a predetermined location as shown in FIG. 5. Next, access hole 35 is tapped to provide threads of a desired size. In the embodiment shown a #10-32 threaded hole 35 is utilized to attach the bypass line 33 to the valve body 40.

Alternatively, any other suitable access point on the valve body 40 or transmission housing 200 (FIG. 6) providing access to a pressurized ATF circuit within the hydraulic system can be utilized to locate such access hole 35. Of course, such location varies for each installation and detailed instructions are provided to the technician for a given transmission application.

Next, an orifice block 37 defining a calibrated restriction or orifice 45 is attached to a first end of bypass line 33. Orifice block 37 includes a fitting 37a having a matching external #10-32 thread for engagement in the threaded access hole 35. Orifice 45 functions to restrict ATF flow by controlling the volume of fluid delivered to the depth filtration assembly 25 to a calculated level based on the pump capacity and the requirements of the hydraulic system. An opposite end of hydraulic bypass line 33 is provided with a flare nut 34 that connects the bypass line to a threaded coupling 38 which, in turn, engages a mating fitting 39 attached to the canister 27.

Figure 6:
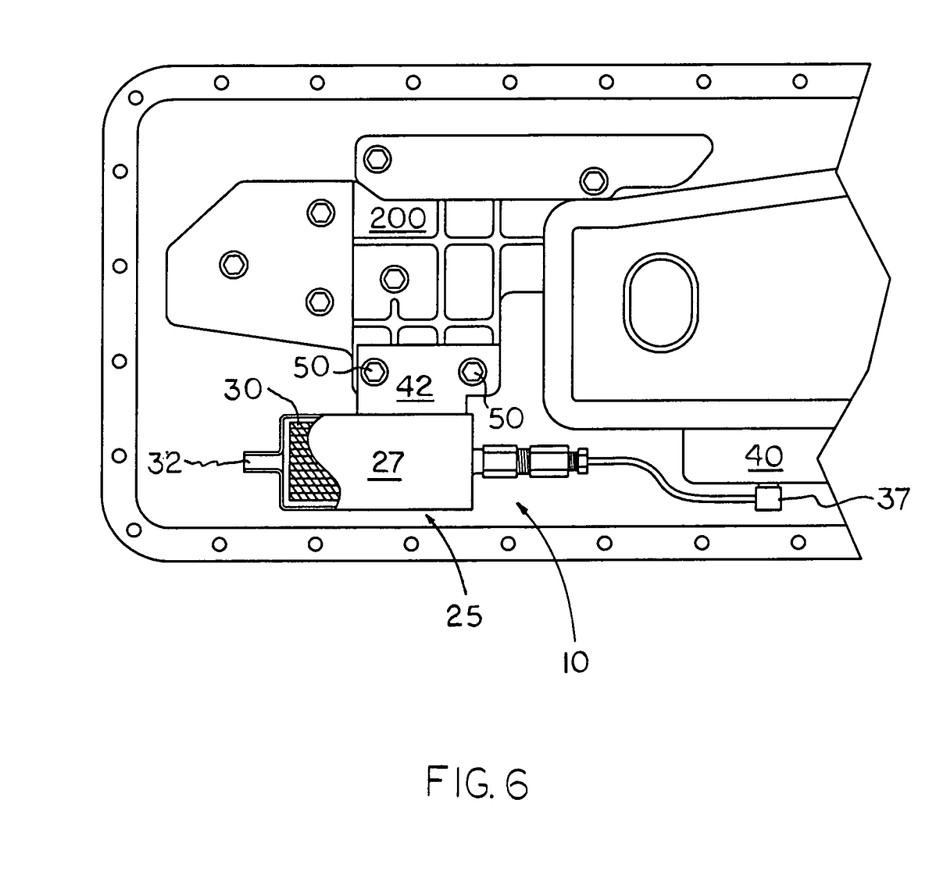
FIG. 6 is a partial bottom plan view of a transmission housing with the ATF pan removed illustrating the present internal bypass filtration circuit installed in its functional position within such housing.

The present internal bypass filtration system provides structures and functional features, which comprise mounting means including, but not limited to, the following structures. The present depth filtration assembly 25 also includes a dedicated mounting bracket 42 for installation of canister 27 at a suitable position within the transmission housing 200 using pre-existing machine screws 50 installed within the housing as shown in FIG. 6.

It will be understood that the present bypass filtration circuit 10 including depth filtration assembly 25 is designed primarily for installation in proximity to the sump pan 120 or other space within the transmission housing 200 (FIG. 6) as an upgrade during industry remanufacture operations. By installing the present bypass filtration circuit 10 during remanufacturing operations, a transmission shop technician need not be relied upon to plumb and install an alternative filtration device externally of the transmission as is the present industry practice. Such practice can result in improper installation, ATF leakage, and pressure loss reducing the service longevity of such an external filtration device.

However, it is contemplated that the present internal bypass filtration circuit 10 will also be provided in an aftermarket kit including a depth filtration assembly 25, bypass line 33, orifice block 37, fittings 38, 39, installation tools, and instructions for internal installation by a qualified service technician.

Although not specifically illustrated in the drawings, it should be understood that additional equipment and structural components will be provided as necessary and that all of the components described above are arranged and supported in an appropriate fashion to form a complete and operative Internal Bypass Filtration System incorporating features of the present invention.

Moreover, although illustrative embodiments of the invention have been described, a latitude of modification, change, and substitution is intended in the foregoing disclosure, and in certain instances some features of the invention will be employed without a corresponding use of other features.

Those skilled in the art will appreciate that the conception upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

What is claimed is:

1. A method of installing an internal bypass filtration circuit in an automatic transmission including at least a housing, a pump, a valve body, a sump pan attached to said housing in covering relation to said valve body and an OEM sump filter, said method comprising the steps of:
   accessing a pressure circuit within said valve body of said automatic transmission;
   providing a depth filtration device designed to filter automatic transmission fluid received from said accessed pressure circuit to remove contaminants and produce a filtered automatic transmission fluid output for discharge into said sump pan;
   installing said depth filtration device within said housing in proximity to said valve body and in fluid communication with said pressure circuit so that automatic transmission fluid received from said pressure circuit is forced under pressure through said depth filtration device independently of any automatic transmission fluid taken up directly by said pump, bypassing any other functional hydraulic circuits within said transmission, and further wherein said installing is performed so that filtered automatic transmission fluid output from said depth filtration device may be discharged directly into said sump pan for recirculation through said OEM sump filter by said pump; and;
   installing a regulation device that regulates the flow of automatic transmission fluid to said depth filtration device.

2. A method of claim 1 wherein the step of installing said depth filtration device further includes the steps of:
   drilling an access hole through an external wall of said valve body in fluid communication with said pressure circuit; and
   forming threads within said access hole.

3. A method of claim 1 further wherein the step of installing said depth filtration device further includes the steps of:
   removing said sump pan from said housing of said transmission;
   attaching an internal bypass line to said valve body via said access hole in fluid communication with said depth filtration means; and
   replacing said sump pan on said housing to enclose said depth filtration means within said sump pan.

4. A method of claim 3 further wherein the step of installing said regulation device further includes the step of:
   positioning an orifice intermediate said valve body and said internal bypass line to restrict the volume of fluid delivered to said depth filtration means to a calculated level based on pump capacity.

5. A method of claim 3 further wherein the step of providing a depth filtration device further includes the step of:
   providing a depth filtration device that is constructed to restrict flow therethrough below a predetermined fluid pressure to ensure volumetric efficiency of said pump.

6. A method of claim 1 wherein said providing step involves providing a microfine depth filter cartridge including depth filtration media enclosed therein.

* * * * *